March 7, 1939. J. K. CHRISTMAS 2,149,278
WHEEL FOR TRACK LAYING VEHICLES
Filed Jan. 26, 1938
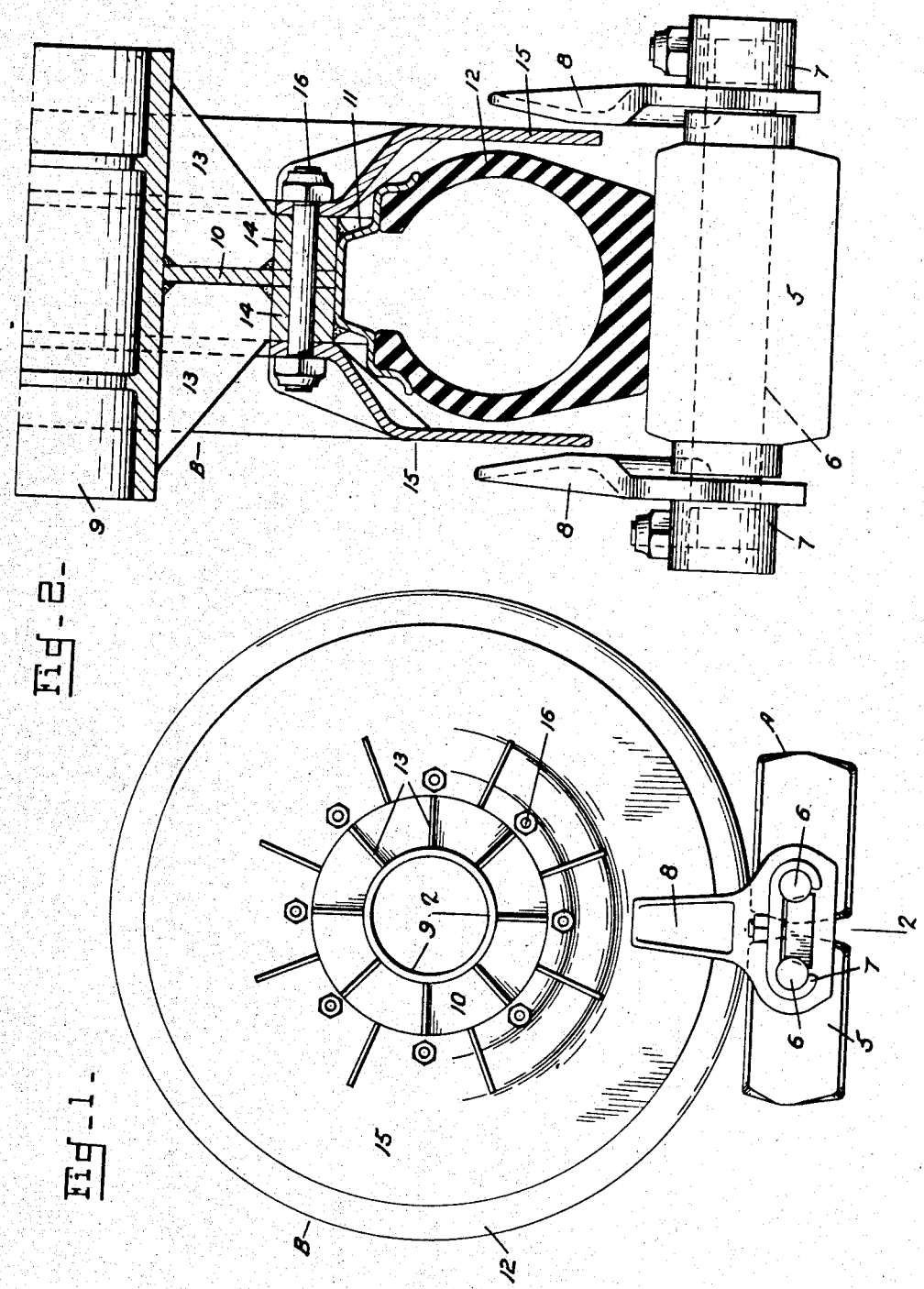
Inventor
John K. Christmas
By W. N. Roach
Attorney Patented Mar. 7, 1939

2,149,278

UNITED STATES PATENT OFFICE 2,149,278

WHEEL FOR TRACK LAYING VEHICLES

John K. Christmas, United States Army, Easton, Pa.

Application January 26, 1938, Serial No. 187,034

2 Claims. (Cl. 305—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a wheel for track-laying vehicles.

In high speed vehicles having pneumatic tired wheels running on an endless track it is customary to provide guide lugs on the track to limit lateral displacement of the track with respect to the wheels. Due to rubbing action of the lugs on the tires the side walls of the tires are weakened and damaged before the tread is worn out.

The purpose of this invention is to provide the wheel with guard plates to prevent contact of the guide lugs with the tires. The guide plates also serve as a protection against gunfire and as a support when the tire is deflated.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation showing a wheel equipped with the guard plates.

Fig. 2 is a sectional view on the line 2—2 of Fig. 1.

Referring to the drawing by characters of reference there is shown a portion of an endless track A and one of the wheels B of a vehicle.

The track is of conventional type and consists of a series of shoes 5 carrying link pins 6 which are connected by links 7. The links are provided with guide lugs 8 which serve to limit lateral displacement of the track with respect to the wheels.

The wheel B consists of a hub 9, a disk 10, a rim 11 on the outer periphery of the disk, and a pneumatic tire 12 mounted on the rim and adapted to ride on the inner surface of the track. A plurality of ribs 13—13 connect the hub, disk and bosses 14—14 on the rim.

A pair of annular plates 15—15 are disposed on opposite sides of the rim and tire and are mounted on bolts 16—16 which pass through the bosses 14—14 and the rim. The plates 14 extend over the side walls of the tire to protect them against gunfire and they have a smaller diameter than the tire to allow for deflection of the tire under a load. These plates also serve as a guard for the tire against contact with the guide lugs 8 of the track, and as a support when the tire is deflated.

I claim:

1. In combination with an endless track having spaced guide lugs, a wheel having a pneumatic tire adapted to run on the track between the lugs, annular plates attached to opposite sides of the wheel and extending over the side walls of the tire, said plates disposed between the tire and the lugs of the track.

2. In combination with an endless track having spaced guide lugs, a wheel having a pneumatic tire adapted to run on the track between the lugs, annular plates attached to opposite sides of the wheel, said plates disposed between the tire and the lugs of the track.

JOHN K. CHRISTMAS.